United States Patent [19]

DeLong et al.

[11] Patent Number: 4,475,762

[45] Date of Patent: Oct. 9, 1984

[54] WHEEL CHAIR RESTRAINT SYSTEM

[75] Inventors: Arthur DeLong, Mertztown; Prem M. Balani, Schillington, both of Pa.

[73] Assignee: U.S. Seating Co., Inc., Topton, Pa.

[21] Appl. No.: 351,626

[22] Filed: Feb. 24, 1982

[51] Int. Cl.³ .......................... B60N 1/08; B60P 7/08; B61D 45/00

[52] U.S. Cl. .................................. 296/65 R; 105/345; 410/19; 410/51

[58] Field of Search ......................... 105/345; 188/2 F; 296/65 R, 65 A; 410/3, 7, 19, 23, 51

[56] References Cited

U.S. PATENT DOCUMENTS

| | | | |
|---|---|---|---|
| 4,027,747 | 6/1977 | Moorman, Jr. | 188/2 F X |
| 4,113,270 | 9/1978 | Barecki | 188/2 F X |
| 4,221,396 | 9/1980 | Kehl | 188/2 F X |
| 4,266,822 | 5/1981 | Barecki et al. | 105/345 X |
| 4,325,576 | 4/1982 | Guthrie | 410/51 X |

*Primary Examiner*—Howard Beltran
*Attorney, Agent, or Firm*—Burns, Doane, Swecker & Mathis

[57] ABSTRACT

A wheel chair restraint system and apparatus. The system includes a foldable seat having a bottom connected to a seat back for movement about a pivot axis between a lowered position and a raised position. The apparatus has a frame base connected to a lower surface of the seat bottom. First and second parallel lock pin supports extend from the frame base and have aligned bores for receiving a lock pin. A guide plate extends from the frame base and cooperates with the first lock pin support to define a space for receiving the wheel to be restrained. The lock pin is movable by a first spring from a retracted position to an engaged position in which the lock pin is supported by the lock pin supports and has a first end protruding beyond the first lock pin support to restrain movement of a wheel. A lever is provided for moving the lock pin back into its retracted position to allow release of the wheel. An interlock plate has a first portion secured to the first lock pin support for movement between a blocking position holding the lock pin in its retracted position and a release position spaced from the bore of the first lock pin support. A second portion of the interlock plate is positioned in the space in such manner that a wheel inserted into the space moves the interlock plate, against the force of a second spring, into its release position so that the lock pin automatically moves into its engaged position.

8 Claims, 9 Drawing Figures

FIG. 4
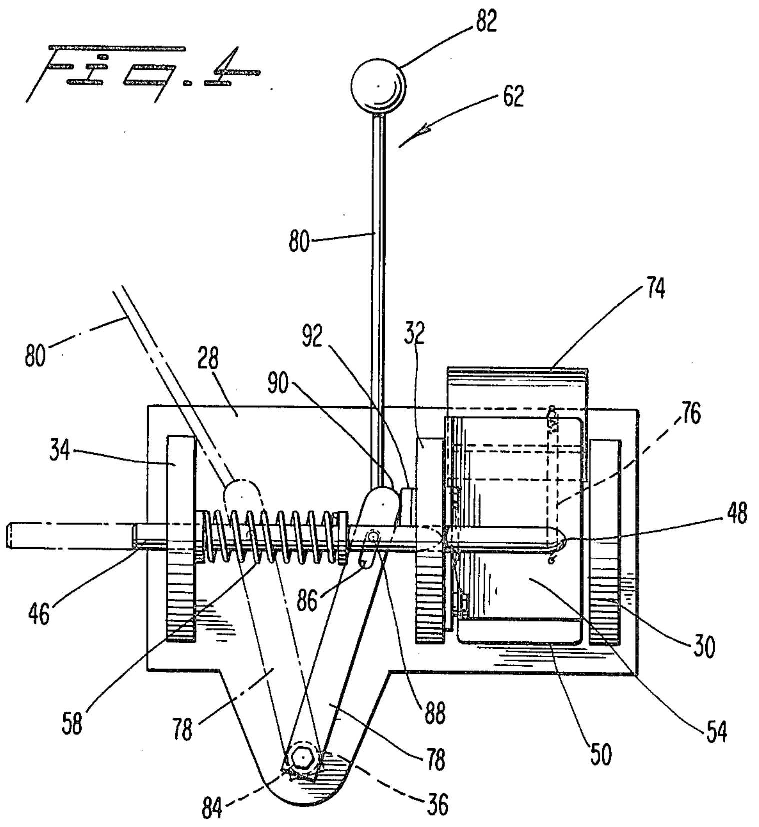
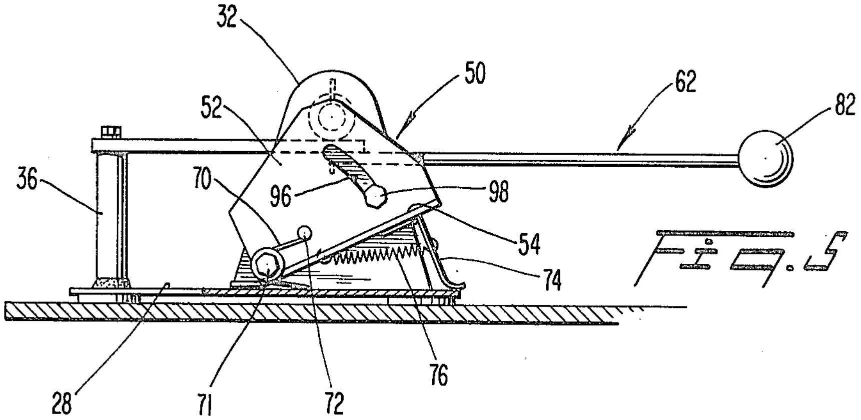
FIG. 5
FIG. 6
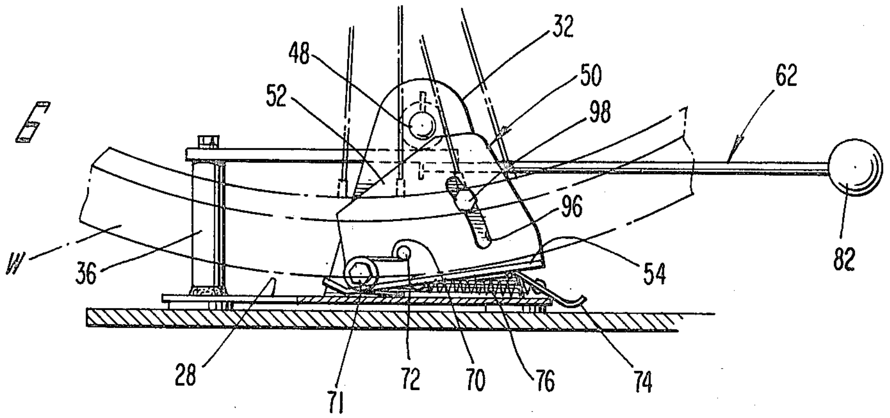

FIG. 7
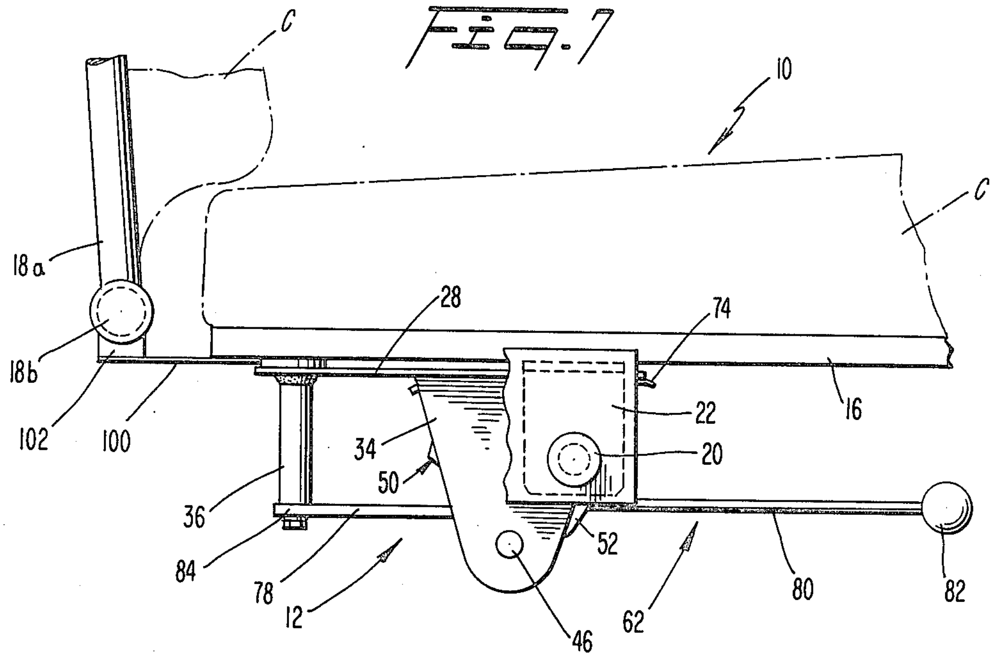
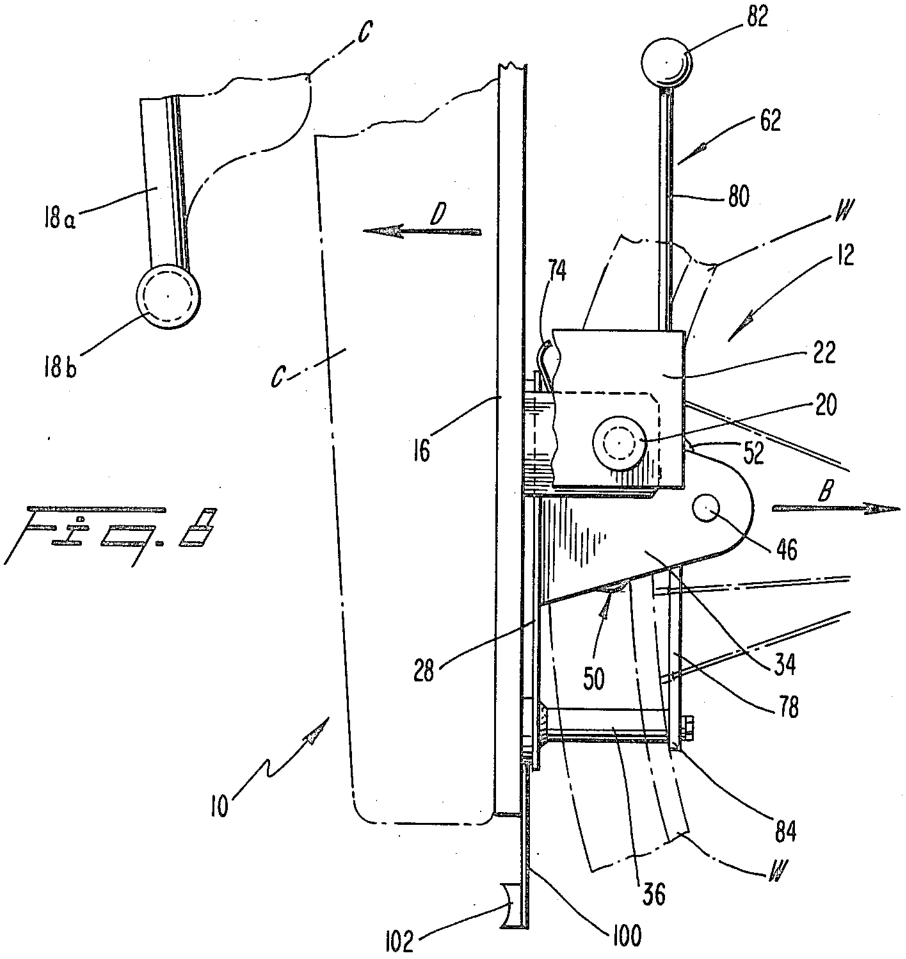
FIG. 8

WHEEL CHAIR RESTRAINT SYSTEM

BACKGROUND OF THE INVENTION

1. Field of the Invention

The present invention relates to a system and an apparatus for restraining a wheel of a wheel chair. More particularly, the invention provides a wheel chair restraint apparatus that is connectable to the bottom of a foldable seat so that the apparatus is positioned for use when the bottom of the seat is folded-up. The wheel chair restraint is also mountable directly on other suitable structure inside a mass transit vehicle, such as a railroad car or bus.

2. Description of the Prior Art

There are several types of wheel chair restraint systems presently available that are designed for use in mass transit vehicles. Two of the known types of designs are bulky and cumbersome and are of the closing jaws type.

Several problems have been encountered with the previously known systems in that the systems use the "closing jaws" principal that often results in damage to the spokes of the wheel of the wheel chair. In one of the previously known designs, a release handle must be lifted in order to release the jaws and unlock the wheel. Such lifting action involves extra effort, first for reaching the handle and then for its subsequent operation.

SUMMARY OF THE INVENTION

The present invention provides an improved wheel chair restraint system and wheel chair restraint apparatus that is designed to overcome the problems encountered with use of previously known systems and apparatus.

The present invention further provides a simple and effective apparatus for temporarily restraining a wheel of a wheel chair carried on a mass transit vehicle. The system and apparatus are easy to operate by a handicapped person and are relatively light in weight. The apparatus is an integral unit that is designed to be easily fastened to the bottom of a seat or other suitable structure and, in operation, is designed to minimize damage to wheel spokes.

One embodiment of the invention provides a wheel chair restraint system combining a foldable seat with a wheel chair restraint apparatus. The seat has a back and a bottom, the seat bottom being connected to the seat back for movement about a pivot axis between a lowered position and a raised position. A frame base of the restraint apparatus is connected to a lower surface of the seat bottom. First and second parallel lock pin supports extend from the frame base. Aligned bores are formed in the lock pin supports for receiving a lock pin. The lock pin is supported by and movable with respect to the bores between a retracted position and an engaged position in which the lock pin is supported by the lock pin supports and has a first end thereof protruding beyond the first lock pin support. A first spring means urges the lock pin towards its engaged position. A lever is connected to the lock pin for moving it between its engaged position and its retracted position. A blocking plate is secured to the first lock pin support for movement between a blocking position holding the lock pin in its retracted position and a release position spaced from the bore of the first lock pin support. Movement of the blocking plate into its release position by a wheel to be restrained unblocks the bore so that the lock pin automatically moves into its engaged position. A second spring urges the blocking plate into its blocking position after removal of the wheel. A guide plate extends from the frame base and cooperates with the first block pin support to define a space for receiving the wheel to be restrained, a portion of the blocking plate is positioned in the space in such manner that a wheel inserted into the space engages the blocking plate and moves the blocking plate into its release position. Movement of the lever returns the lock pin to its retracted position to thereby allow removal of the wheel from the space.

The invention, and its objects and advantages, will become more apparent in the detailed description of the preferred embodiments hereinafter presented.

BRIEF DESCRIPTION OF THE DRAWINGS

In the detailed description of the preferred embodiments of the invention, reference is made to the accompanying drawings, in which:

FIG. 5 is a view taken along line 5—5 of FIG. 2;

FIG. 6 is a view similar to FIG. 5 taken along line 6—6 of FIG. 3;

FIG. 7 is a side view of the embodiment of FIG. 1 in a lowered position;

FIG. 8 is a side view of the embodiment of FIG. 1 in a raised, engaged position; and FIG. 9 is an enlarged view of a portion of FIG. 3 showing the locking pin in a position locking the wheel.

DESCRIPTION OF THE PREFERRED EMBODIMENTS

Figure 1:
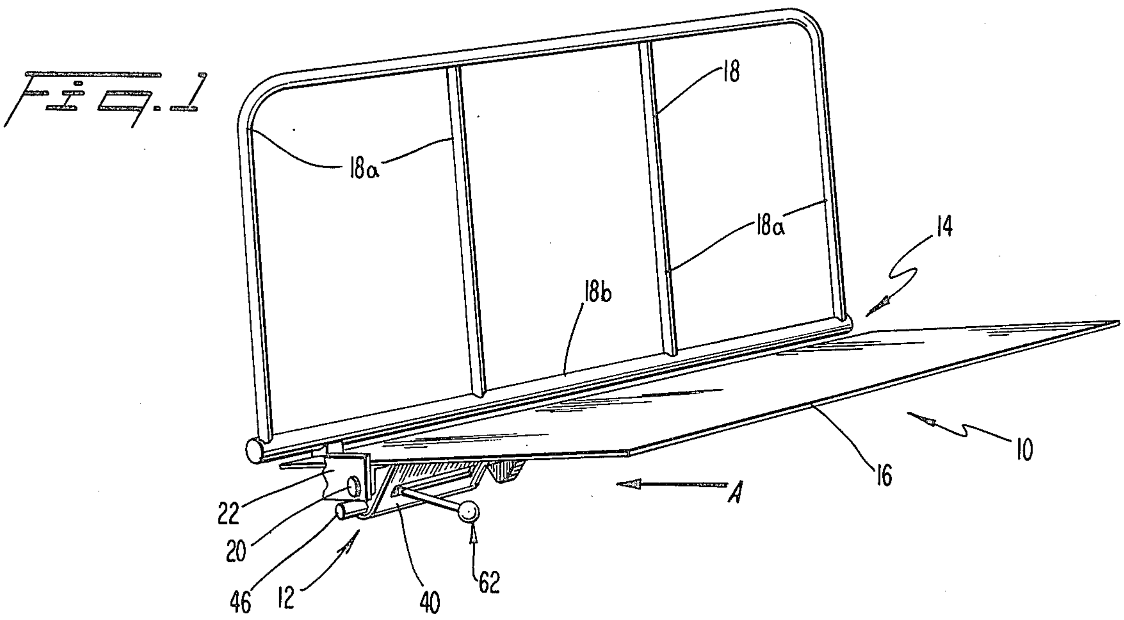
FIG. 1 is a front perspective of one embodiment of a wheel chair restraint system according to the present invention.

The present description will be directed in particular to elements forming part of, or cooperating more directly with, the present invention. Elements not specifically shown or described herein are understood to be selectable from those known in the art.

Referring now to the drawings, and to FIG. 1 in particular, one embodiment of the present invention is illustrated and will be described in connection with a wheel chair restraint system, generally designated 10. The restraint system 10 includes a wheel chair restraint apparatus, generally designated 12, that is designed to be used with a foldable seat, generally designated 14. The seat 14 has a seat bottom 16 that is connected to a seat back 18 by a pivot 20 carried by a plate 22. The plate 22 is affixed to stationery structure, such as the seat back 18 or other portions of the vehicle carrying the foldable seat 14. For the ease of illustration, cushions "C" covering the seat bottom 16 and the seat back 18 have been illustrated only in FIGS. 7 and 8.

Figure 2:
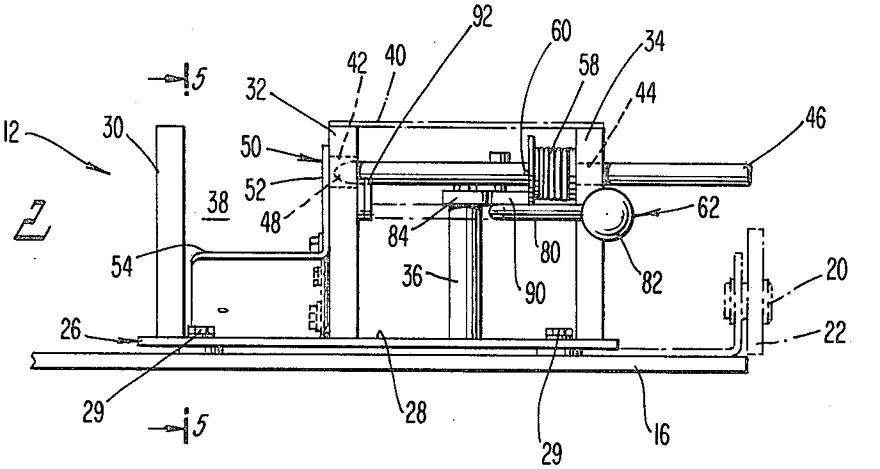
FIG. 2 is a view in the direction of arrow A of FIG. 1, with the orientation rotated so as to position the seat bottom underneath the apparatus.
Figure 3:
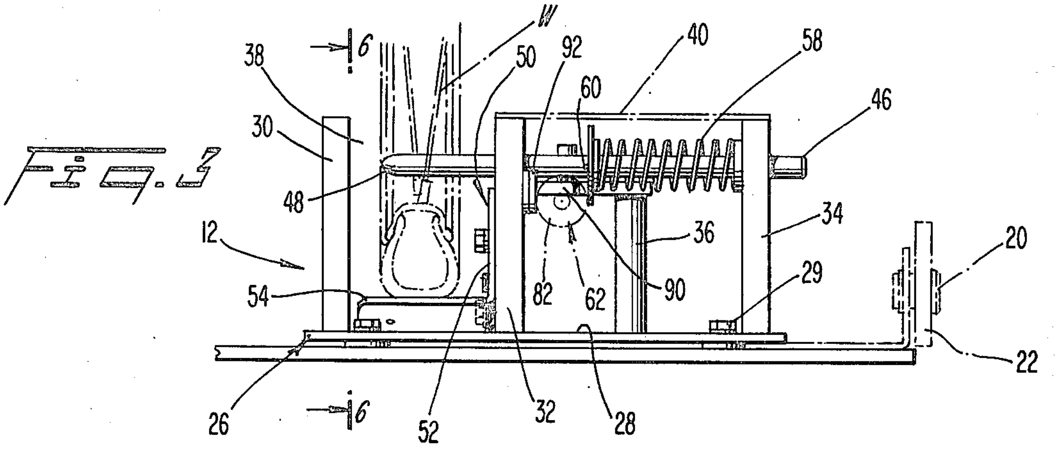
FIG. 3 is a view similar to FIG. 2 illustrating the wheel chair restraint apparatus engaged with a wheel of a wheel chair.

Referring now to FIGS. 2 and 3, components of the wheel chair restraint apparatus 12 are illustrated. The apparatus 12 includes a frame assembly, generally designated 26, that includes a frame base 28 designed to be connected by bolts 29, or other suitable means, to the seat bottom 16. Formed integral with or affixed to the frame base 28 are a guide plate 30, a first lock pin support 32, a second lock pin support 34, and a frame bush 36. The guide plate 30 and the first lock pin support 32 cooperate with each other to form a space 38 for receiving a wheel "W" of a wheel chair or other structure to be restrained by the apparatus 12. As best illustrated in FIG. 1, a cover plate or wheel chair restraint cover 40 is connected to and encompasses the pin supports 32 and 34. The cover 40 is illustrated in phantom in FIGS. 2 and 3 and is omitted from the other figures for the purposes of clarity.

Referring again to FIG. 2, the first lock pin support 32 has a bore 42 formed therein that is aligned with a bore 44 formed in the second lock pin support 34. A lock pin 46 is received in the bores and is movable between a retracted position, as illustrated in FIG. 2, and an engaged position, as illustrated in FIG. 3. In the retracted position, an end 48 of the lock pin 46 is located within the bore 42 of the first lock pin support 32. A generally L-shaped or angled interlock plate 50 provides plate means for holding the lock pin in its retracted position. The interlock plate 50 has a first portion 52 that is movable into a blocking position blocking the bore 42 in the first lock pin support 32. The interlock plate 50 has a second portion 54 positioned in the space 38. A spring 70 urges the interlock plate into a blocking position in which the second portion 54 is located to be engaged by the wheel "W," and the first portion 52 blocks the bore 42. As will be described in more detail later, movement of the second portion 54 by the wheel "W" results in movement of the first portion 52 away from the bore 42 so that the pin 46 automatically moves into its engaged position. It will be readily apparent from FIGS. 3 and 9 that lateral movement of the restrained wheel "W" is prevented by cooperation between the guide plate 30 and the first lock pin support 32, while the lock pin 46 prevents forward movement of the wheel "W" out of the restraint system 10.

Movement of the pin 46 from its retracted to its engaged positioned is accomplished by the action of a spring 58. One end of the spring bears against the second lock pin support 34, while the other end of the spring is prevented from moving by a pin or blocking member 60 carried by the shaft of the lock pin 46. A lever 62, as will be described in more detail hereinafter, is provided for moving the lock pin 46 from its engaged position into its retracted position.

As previously described, a torsion spring 70 is positioned between the frame base 28 and the second portion 54 of the interlock plate 50 to urge the plate into its blocking position. A bolt 71 connects the spring 70 to the first portion 52 of the interlock plate 50. One leg of the spring 70 bears against a pin 72 carried by the interlock plate 50 and a second leg of the spring 70 bears against the frame base 28. Preferably, a protection plate 74 is pivotally connected to a lower surface of the first portion 52 and extends downwardly into abutting contact with an upper surface of the frame base 28. A spring 76 urges the protection plate 74 into a position closing the gap between the interlock plate 50 and the frame base 28. The force of the spring 76 is designed to be readily overcome when a wheel "W" engages the second portion 54 of the interlock plate, as illustrated in FIG. 6. The protection plate 74 and its spring 76 is omitted from FIGS. 2, 3 and 9 for the sake of clarity.

Figure 4:
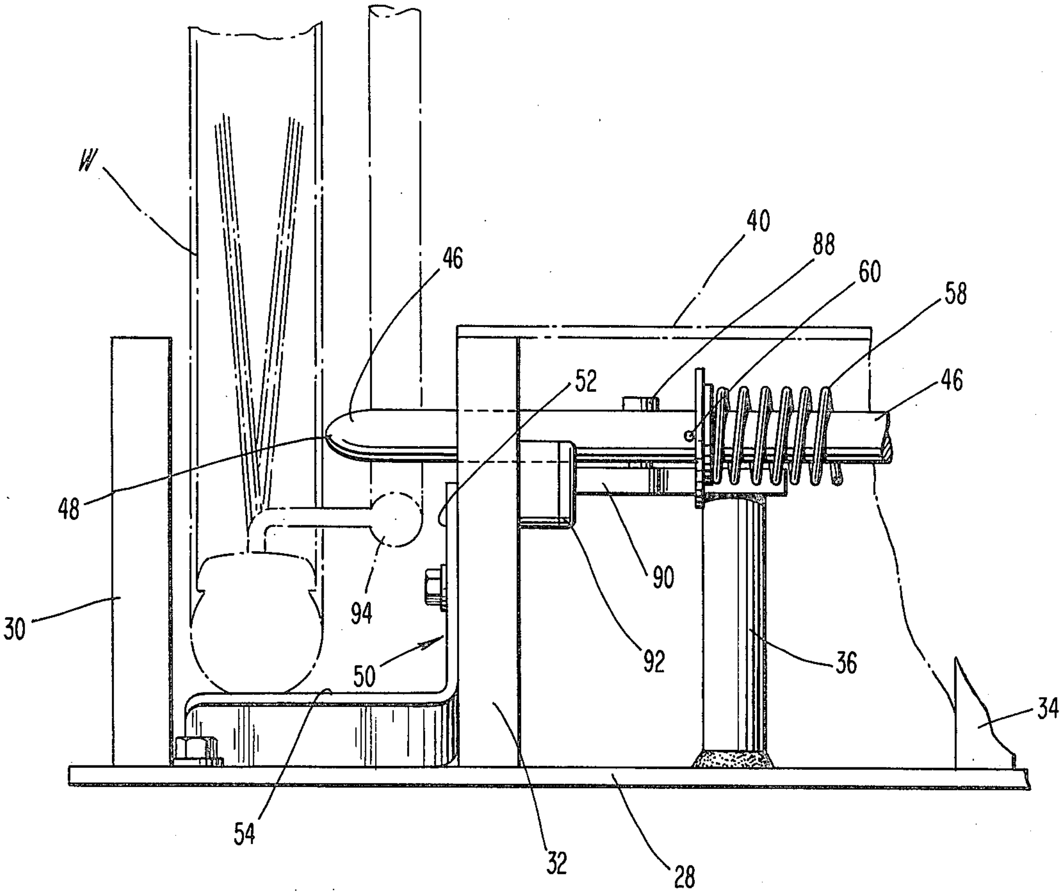
FIG. 4 is a bottom view of the embodiment illustrated in FIG. 1.

As mentioned earlier, a lever 62 is provided to move the lock pin 46 from its engaged positioned to its retracted position. The lever 62 has a lock lever portion 78, a handle rod portion 80, and a pin knob 82. The lock lever 78 and the handle rod 80 preferably have confronting end portions interconnected to each other, for instance, by welding. Preferably, the length of the handle rod 80 is approximately twice the length of the lock lever 78 so as to provide a 2:1 mechanical advantage that facilitates movement of the lock pin between its engaged and retracted positions. An end 84 of the lock lever 78 is supported for pivotal movement about the bush 36. A slot 86 is formed in an end portion of the lock lever 78 so that the lock lever can be connected by a pin or bolt 88 to an intermediate portion of the lock pin 46. An uppermost end 90 of the lock lever 78, in the orientation illustrated in FIG. 4, contacts an abutment or stop 92 carried by the first lock pin support 32 to limit movement of the lock pin by the spring 58. The stop 92 is a rubber stop which absorbs the impact of the lever 90 striking the guide plate 32 under the pressure of the spring. Thus the possibility of damage to spokes of the wheel is eliminated. Furthermore, the end of locking pin 48 (shown in FIG. 4) is suitably shaped to minimize any damage in the event that the pin should strike a spoke.

Referring now to FIGS. 5 and 6, it can be seen that the bolt 71 serves to pivotally connect the interlock plate 50 to the first lock pin support 32. An arcuate-shaped slot 96 formed in the first portion 52 of the interlock plate 50 receives a guide bolt 98 carried by the lock pin support 32.

Referring now to FIGS. 1, 7, and 8, the seat back 18 of the foldable seat 14 is comprised of upright bars 18*a* that are interconnected by a cross pipe 18*b*. A plate 100, which is connected to or formed integral with the seat bottom 16, carries an elastomeric bush or bearing 102 that contacts the cross pipe 18*b* to hold the seat bottom in its lowered position, as illustrated in FIG. 7.

An important feature of the invention, as illustrated in FIG. 8, is the positioning of the restraint apparatus 12 on the seat bottom 16 in such manner that the axis of the lock pin 46 is positioned lower than the axis of the pivot 20 when the seat bottom 16 is in its raised position. Because of such orientation, any force exerted on the lock pin 46 by the wheel "W" in the direction of the arrow "B" will result in a corresponding force urging the top of the seat bottom 16 towards the seat back 18, as illustrated by the arrow "D".

Considering now the use of the wheel chair restraint system provided by the present invention, a foldable seat 14 having a wheel chair restraint apparatus 12 affixed to its seat bottom 16 is moved from the position illustrated in FIG. 7 to that illustrated in FIG. 8 when it is desired to restrain a wheel of a wheel chair or other suitable structure. Initially, the lock pin 46 of the apparatus 12 is in its retracted position, as illustrated in FIGS. 2 and 5 of the drawings. When a wheel is inserted into the space 38, the interlock plate 50 is moved from its blocking position so that the lock pin 46 automatically moves to its extended restraining position, as best illustrated in FIG. 3. The pin 46 then serves to restrain movement of the wheel "W", as illustrated in FIGS. 3, 6, 8, and 9. Such movement of the pin 46 into its locking position occurs automatically when the interlock plate 50 is moved from the blocking position illustrated in FIG. 5 to the release position illustrated in FIG. 6. When the occupant of the wheel chair desires to release the wheel chair from the apparatus 12, the pin knob 82 is grasped and moved from the solid line position to the phantom line position of FIG. 4 thereby compressing the spring 58 and moving the pin 46 from the solid line to the dotted line position. Upon removal of the wheel "W" from the space 38, the interlock plate 50 automatically moves into the blocking position illustrated in FIGS. 2 and 5. The seat bottom 16 is then lowered so that the seat 14 can be used in a conventional manner.

Previously, specific embodiments of the present invention have been described. It should be appreciated, however, that these embodiments have been described for the purposes of illustration only, without any intention of limiting the scope of the present invention. For instance, the positions of the guide plate 30 and the second lock pin support 34 can be interchanged and the other components suitably repositioned so as to adapt the apparatus for use by a left-handed person. It is the intention that the present invention be limited only by the appended claims.

What is claimed is:

1. A wheel chair restraint apparatus connectable to a support surface comprising:
   - frame means for mounting the wheel chair restraint apparatus on a support surface;
   - pin support means carried by said frame means for supporting and guiding movement of a lock pin;
   - a lock pin carried by said pin support means, said lock pin being movable between a retracted position spaced from a wheel of a wheel chair to be restrained and an engaged position in which the lock pin is engaged with the wheel to prevent movement thereof;
   - first biassing means for urging said lock pin into said engaged position;
   - lever means for moving said lock pin between said engaged position and said retracted position;
   - plate means movable into a locking position for holding said lock pin in said retracted position; and
   - second biassing means for urging said plate means into said blocking position, said plate means being engageable by the wheel to be restrained and being movable by the wheel into a release position so that said lock pin moves from said retracted position into said engaged position to thereby prevent movement of the wheel.

2. The wheel chair restraint apparatus of claim 1, wherein the support surface is the lower surface of a seat bottom, the seat bottom being movable about a pivot axis between a raised position and a lowered position, said apparatus being connected to the seat bottom in such manner that said lock pin has an axis spaced lower than the pivot axis when the seat bottom is in the raised position whereby a force exerted on said lock pin by a restrained wheel urges the seat bottom into the raised position thereof.

3. The wheel chair restraint apparatus of claim 1 or 2, wherein said lever means is connected to said lock pin and extends in an upward direction when said lock pin is engaged with the wheel, said lever means being manually movable to move said lock pin into said retracted position to thereby release the engaged wheel.

4. The wheel chair restraint apparatus of claim 1 or 2, wherein said pin support means comprises first and second parallel lock pin supports mounted on said frame means, said lock pin supports having aligned bores for supporting and for guiding movement of said lock pin.

5. The wheel chair restraint apparatus of claim 4, wherein said plate means comprises an angled member having a first portion connected to said first lock pin support for movement with respect to said first lock pin support, and a second portion engageable and movable by the wheel to be restrained, said first portion in the blocking position of said plate means blocking the bore in said first lock pin support.

6. The wheel chair restraint apparatus of claim 5, further comprising a guide plate mounted on said frame means, said guide plate being spaced from and cooperating with said first lock pin support to define a space for receiving a wheel.

7. The wheel chair restraint apparatus of claim 5, wherein said lever means is connected to a portion of said lock pin located intermediate said first and said second lock pin supports.

8. A wheel chair restraint system comprising:
   - a foldable seat having a seat back and a seat bottom, the seat bottom being connected to the seat back for movement about a pivot axis between a lowered position and a raised position;
   - a frame base connected to a lower surface of said seat bottom;
   - first and second parallel lock pin supports extending from said frame base, aligned bores being formed in said lock pin supports;
   - a lock pin received in said bores for movement between a retracted position and an engaged position in which said lock pin is supported by said lock pin supports and has a first end thereof protruding beyond said first lock pin support;
   - first spring means for urging said lock pin towards said engaged position;
   - lever means for moving said lock pin between said engaged position and said retracted position;
   - plate means secured to said first lock pin support for movement between a blocking position holding said lock pin in said retracted position and a release position spaced from the bore of said first lock pin support;
   - second spring means for urging said plate means towards said blocking position; and
   - a guide plate extending from said frame base and cooperating with said first block pin support to define a space for receiving a wheel to be restrained, a portion of said plate means being positioned in said space in such manner that a wheel inserted into the space engages the plate means and moves the plate means into the release position thereof so that said lock pin moves into the engaged position thereof thereby restraining the wheel in the space, movement of said lever means returning said lock pin to said retracted position to thereby allow removal of the wheel from the space.

* * * * *